Aug. 18, 1942.    M. D. KICZALES    2,293,065
AIR FLOW CONTROL DAMPER
Filed June 26, 1939
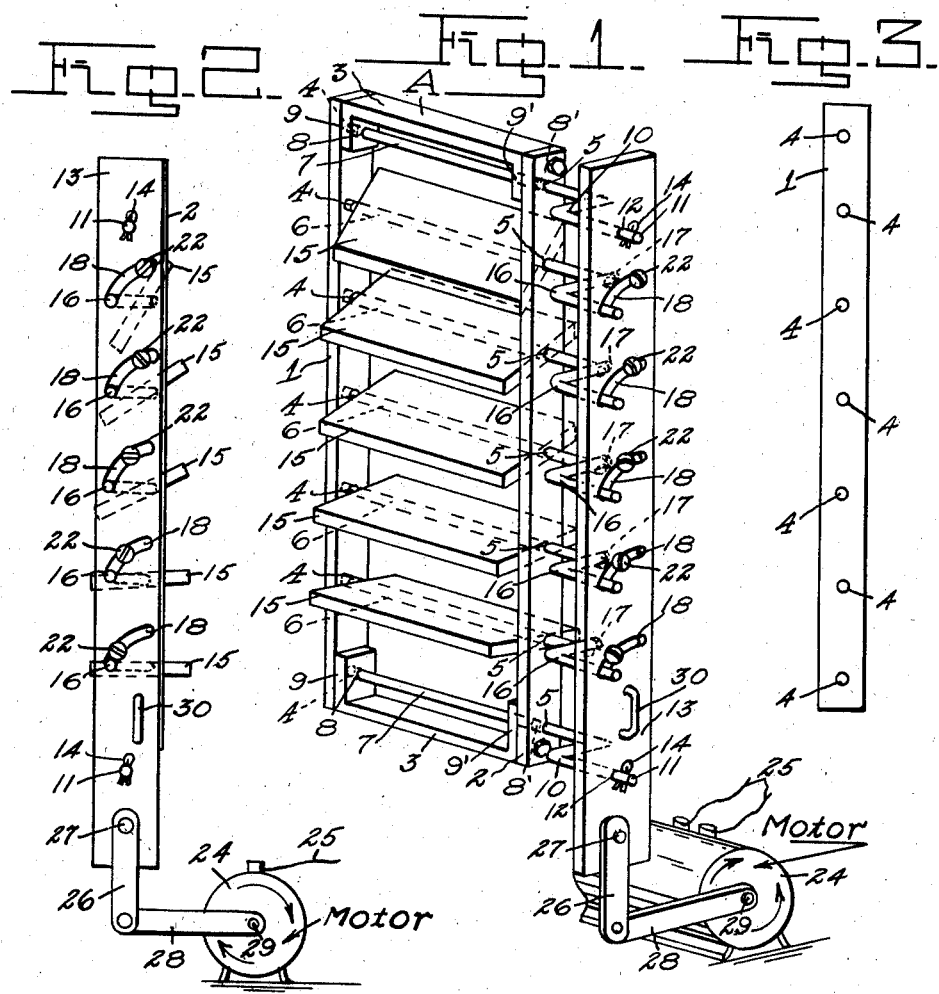
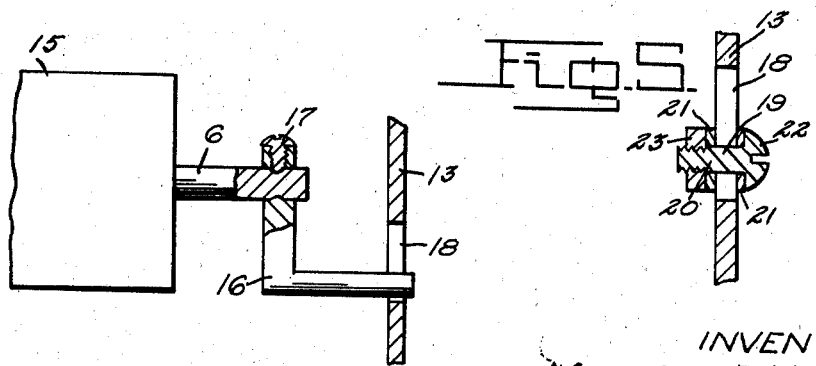
INVENTOR
Maurice D. Kiczales
BY
Adam Richmond
ATTORNEY Patented Aug. 18, 1942

2,293,065

UNITED STATES PATENT OFFICE 2,293,065

AIR FLOW CONTROL DAMPER

Maurice D. Kiczales, Washington, D. C.

Application June 26, 1939, Serial No. 281,306

6 Claims. (Cl. 98—110)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to air-flow control dampers for use in connection with air conditioning systems.

One of the objects of the invention is to provide a multiple louvered damper unit having a single arm connected to operate all of the louvers simultaneously, including adjustable means for controlling the amount of opening or closing of each individual louver and means for permitting angular adjustment of each louver into a plurality of positions to deflect air issuing therefrom in any desired direction whereby an equal flow of air is obtained over the whole face area of the complete damper unit.

Another object of the invention is to provide a multiple louvered damper unit which is efficient in operation, simple in construction, inexpensive, strong, durable and not liable to become out of order.

With the above and other objects and advantages in view, the invention consists in certain features of construction and operation of parts which will hereinafter appear, and in which—

Fig. 1 is a perspective view of a multiple louvered damper unit embodying the invention, showing the louvers in varied adjusted positions for obtaining an equal flow of air over the whole face area of the complete damper unit;

Fig. 2 is a side elevation thereof;

Fig. 3 is a side elevation of one of a pair of side bars used in carrying out the invention;

Fig. 4 is an enlarged fragmentary detail view partly in section of a part of the invention for changing each louver from full closure to full open position, including means for locking the louvers in any position between these two positions, and Fig. 5 is an enlarged detail vertical sectional view of an adjusting device used in carrying out the invention.

In the illustrated embodiment characterizing the invention A indicates generally a complete air-flow control damper unit which is adapted to be used in connection with air conditioning systems employed in theatres and like places, said air-flow control damper unit comprising a pair of spaced side bars 1 and 2 that are connected together at their upper and lower ends by crosspieces 3.

The side bars 1 and 2 are formed with a series of spaced openings 4 and 5 respectively, for receiving the ends of a plurality of transversely extending intermediate pivot rods 6 and end pivot rods 7. The ends of the rods 7 also extend through aligned openings 8 and 8' formed in vertically extending portions 9 and 9' respectively of the cross-pieces 3. One of the ends of each of the rods 7 is formed with fixed cranks 10, the outer or free ends 11 of which project through apertures 12 formed in the opposite ends of an actuating bar 13, and held in place thereon by any suitable means such as by cotter pins 14, whereby the actuating bar 13 is movably supported on the damper unit.

A shutter forming louver or slat 15 is fixedly secured on each intermediate pivot rod 6 whereby the louvers on the rods 6 will be moved, simultaneously with the actuation of the rods. The louvers 15 on the pivot rods 6 are disposed between the side bars 1 and 2 and are made of a sufficient width as to cause them to overlap when all of the louvers are in a closed position.

The ends of the rods 6 that extend through the openings 5 formed in the side bar 2 are provided with movable lever crank arms 16 which may be angularly adjusted on the ends of the rods 6, and locked in adjusted position thereon by any suitable means, such as by an adjusting screw 17, as illustrated in detail in Fig. 4, whereby each rod 6 may be adjusted with relation to its lever 16 thus permitting the louvers mounted on the rods 6 to be angularly adjusted into a plurality of positions from full opening to full closing, to deflect air issuing therefrom in any desired direction.

The outer or free ends of the levers 16 on the rods 6 extend through a series of spaced arcuate slots 18 formed in the actuating bar 13. The arcuate slots 18 are adapted to travel along the outer ends of the levers 16 and in order to vary the amount of travel of the slots pass the outer ends of the levers 16, whereby the amount of opening or closing of each individual louver may be controlled, any suitable means may be provided in each slot 18 which means is adapted to be adjustably set and locked along the length of the slots, as illustrated in detail in Fig. 5, said means may include bolts 19 having shanks 20, one of each of which extends through one of each of the slots 18, washers 21 of a diameter larger than the width of the slots mounted on the shanks, certain of said washers 21 engaging one face of the actuating bar 13 and the other of said washers engaging the opposite face of the bar, a head 22 which may be slotted, engaging the washers on one side of the bar, and a nut 23 threaded on each of the shanks and engaging the washers on the opposite side of the bar.

The slotted bar 13 may be actuated manually but is preferably actuated electromechanically by means of a slow moving reversing electric motor 24 which is connected to a suitable source of electric supply by conductors 25 and to the lower end of the actuating bar by link members including a link 26 pivoted to one end at 27 to the lower end of the actuating bar and pivoted at its other end to one end of an operating arm 28 which is fixably mounted at its other end on the shaft 29 of the electric motor 24. To manually actuate the bar 13, a handle 30 is provided thereon.

In operation, assuming that the electric motor has been energized to rotate in a clockwise direction as indicated by the arrow, the operating arm 28 is forced upwardly forcing the link 26 upwardly and hence forcing the actuating bar 13 upwardly, whereby the lower ends of the arcuate slots 18 in the bar are caused to actuate the levers 16 on the ends of the intermediate rods 6, to thus move the louvers 15 on the pivot rods outwardly to open position, the amount of opening of each louver depends on the distance that the lower ends of the slots 18 have to travel before they engage the levers 16 which amount of travel is governed by the adjusting means in the slots and on the amount of adjustment given to each of the levers on the rods 6, the said levers 16 being locked in adjusted position on the rods by means of the adjusting screws 17. The louvers 15 will be closed in the reversed order, that is to say, upon reversal of the motor in a counter-clockwise direction, as indicated by the arrow, the arm 28 is forced downward thereby pulling on the link 26 in a downward direction, thus pulling the actuating bar 13 downwardly. This action causes the slots 18 to move downwardly until the adjusting means mounted therein abut against the outer ends of the levers 16, which adjusting means has been set in the slots a predetermined distance, which causes the progressive closing of all of the louvers 15 beginning from the lowermost louver upon the operation of the bar 13. The adjusting means on the lowest slot 18 in the bar 13 is set closer to the lower end of the slot than the adjusting means in the other slots, whereby upon the actuation of the bar 13 the adjusting means is caused to act on the lowest lever 16 on the lowermost pivot rod 6 first, to close the louver mounted thereon because of the wider opening thereof than the other louvers. The adjusting means in the uppermost slot 18 in the bar 13 is set at the upper end of the slot whereby the uppermost slot will move a greater distance before the outer end of the uppermost lever 16 is acted on by the adjusting means to close the uppermost louver as it is the least opened of the louvers, the adjusting means in the other slots 18 being adjustably set in the length of the slots according to the amount of opening of each louver.

To manually operate the bar 13 for actuating the louvers through the levers 16 and rods 6, the handle 30 on the bar 13 is grasped by the hand and pushed upwardly or pulled downwardly whereby the bar is actuated either up or down. To move and set the adjusting means along the length of the slots 18, the slotted head 22 of the adjusting means may be engaged by a screwdriver to unscrew the shank 20 a sufficient amount from the nut 23 to slide the adjusting means in the slots and to lock the adjusting means in adjusted position, the nut is tightened up on the shank.

It will thus be seen that there is provided a highly novel and useful form of air flow control damper unit, which is well adapted for all the purposes indicated. Even though there has been herein shown certain features of construction and operation of parts, it is nevertheless to be understood that various changes may be made therein, without departing from the spirit or scope of the invention.

Having described my invention, what I claim as new and wish to secure by Letters Patent is:

1. In an air-flow control damper unit, a frame having pivots mounted thereon, louvers mounted on said pivots, an operating bar having arcuate slots therein, adjusting means on said pivots extending through the slots in said bar, said bar adapted to actuate said means for actuating said pivots for moving said louvers into full opened or full closed positions or into positions intermediate the full opened or closed positions, and means adjustably mounted in the slots in said bar to in effect increase or decrease the length of said slots, whereby the amount of actuation of the means on said pivots by said bar may be controlled for controlling the amount of actuation of said pivots and hence the amount of opening or closing of the louvers mounted on said pivots.

2. In an air-flow control damper unit, a frame, an operating bar having arcuate slots therein, pivot rods provided with crank arms mounted on said frame, louvers mounted on said pivot rods, said crank arms on said pivot rods extending through the slots in said bar, said bar adapted to actuate said crank arms for actuating said pivot rods for moving said louvers into full opened or closed positions or into positions intermediate the full opened or closed positions and means adjustably mounted in the slots in said bar to in effect increase or decrease the length of said slots, whereby the amount of actuation of said crank arms by said bar may be controlled, for controlling the amount of actuation of said pivot rods and hence the amount of opening or closing of the louvers mounted on said pivot rods.

3. In an air flow control damper unit, a frame including a plurality of louvers pivotally mounted thereon, a bar, means on said louvers connected to be actuated by said bar for actuating said louvers into full open or full closed positions, arcuate slots in said bar having connection with said means, and means arcuately adjustable in said arcuate slots for controlling the opening and closing of the louvers by said bar.

4. In an air flow control damper unit, a frame including a plurality of rods pivotally mounted thereon and provided with crank ends angularly adjustable, louvers mounted on certain of said rods and adapted to move simultaneously therewith, a bar including slots movably mounted on the frame and connected to actuate the crank ends of said rods for actuating said louvers into a full open or full closed position, and means for locking the crank ends in adjusted position on said rods.

5. In an air flow control damper unit, a frame including a plurality of rods pivotally mounted thereon and provided with crank ends angularly adjustable, a louver mounted on each of said rods and adapted to move simultaneously therewith, a bar including slots movably mounted on the frame and connected to actuate the crank ends of said rods for actuating said louvers into a full open or full closed position, and means adjustably mounted in said slots and adapted to control the amount of movement of each of said crank ends of said rods in said slots, whereby the louvers on said rods are actuated by said bar into positions from full closure to adjusted positions between the full closure and full open positions.

6. In an air flow control damper unit a frame including a plurality of rods pivotally mounted thereon, and provided with crank ends, certain of said crank ends being angularly adjustable on said rods, louvers mounted on certain of said rods and adapted to move simultaneously therewith, means for locking said angularly adjustable crank end in adjusted position on said rods, an actuating bar connected to be movably supported on the crank ends of the other of said rods, arcuate slots in said bar having sliding connection with the crank ends of the rods on which said louvers are mounted, said bar adapted to actuate said crank ends of said rods to actuate said louvers into a full open and full closed position, means adjustable in said arcuate slots for controlling the amount of movement of said crank ends therein, whereby the amount of opening or closing of said louvers on said pivot rods may be controlled and means for actuating said bar.

MAURICE D. KICZALES.